United States Patent
Zhou

(10) Patent No.: US 9,800,594 B2
(45) Date of Patent: Oct. 24, 2017

(54) METHOD AND SYSTEM FOR DETECTING UNAUTHORIZED ACCESS ATTACK

(71) Applicant: Sangfor Technologies Company Limited, Shenzhen (CN)

(72) Inventor: Xin Zhou, Shenzhen (CN)

(73) Assignee: SANGFOR TECHNOLOGIES COMPANY LIMITED, Shenzhen (CN)

( * ) Notice: Subject to any disclaimer, the term of this patent is extended or adjusted under 35 U.S.C. 154(b) by 21 days.

(21) Appl. No.: 14/849,747

(22) Filed: Sep. 10, 2015

(65) Prior Publication Data
US 2016/0080401 A1 Mar. 17, 2016

(30) Foreign Application Priority Data
Sep. 12, 2014 (CN) .......................... 2014 1 0465196

(51) Int. Cl.
*H04L 29/06* (2006.01)
*H04L 29/08* (2006.01)

(52) U.S. Cl.
CPC ...... *H04L 63/1416* (2013.01); *H04L 63/0236* (2013.01); *H04L 63/0245* (2013.01); *H04L 63/1433* (2013.01); *H04L 63/1441* (2013.01); *H04L 63/168* (2013.01); *H04L 67/02* (2013.01)

(58) Field of Classification Search
CPC ............... H04L 63/1416; H04L 63/168; H04L 63/0245; H04L 63/1441; H04L 67/02; H04L 63/1433; H04L 63/0236
See application file for complete search history.

(56) References Cited

U.S. PATENT DOCUMENTS

| 6,442,177 B1* | 8/2002 | DeBray | H04J 3/07 370/505 |
|---|---|---|---|
| 2003/0172155 A1* | 9/2003 | Kim | G06F 21/31 709/224 |
| 2006/0059550 A1* | 3/2006 | Kausik | G06Q 20/027 726/11 |
| 2006/0288220 A1* | 12/2006 | Pennington | H04L 63/02 713/176 |
| 2008/0086435 A1* | 4/2008 | Chesla | H04L 63/168 706/12 |
| 2009/0100518 A1* | 4/2009 | Overcash | G06F 21/552 726/22 |
| 2011/0238484 A1* | 9/2011 | Toumayan | G06Q 30/02 705/14.39 |

(Continued)

Primary Examiner — Hosuk Song
Assistant Examiner — J. Brant Murphy
(74) Attorney, Agent, or Firm — Anova Law Group, PLLC

(57) ABSTRACT

A method is provided for detecting unauthorized access attack. The detecting method includes obtaining at least one HTTP request and at least one URL address of the HTTP request by parsing the HTTP request; determining whether there exist one or more protection rules corresponding to the URL address; and, when it is determined that the protection rules corresponding to the URL address exit, obtaining access data of the HTTP request. The detecting method also includes determining whether the access data satisfies the protection rules; and, when it is determined that the access data does not satisfy the protection rules, determining the corresponding HTTP request of the URL address to be an unauthorized access attack.

17 Claims, 6 Drawing Sheets

(56) References Cited

U.S. PATENT DOCUMENTS

| | | | | |
|---|---|---|---|---|
| 2011/0252469 A1* | 10/2011 | Cho | ............... | H04L 63/0236 726/13 |
| 2013/0055384 A1* | 2/2013 | Shulman | ............ | H04L 63/1425 726/22 |
| 2013/0227078 A1* | 8/2013 | Wei | ..................... | H04L 67/02 709/219 |
| 2014/0317738 A1* | 10/2014 | Be'ery | ................ | H04L 63/14 726/23 |
| 2015/0128247 A1* | 5/2015 | Rapaport | ............ | H04L 63/102 726/13 |

* cited by examiner

METHOD AND SYSTEM FOR DETECTING UNAUTHORIZED ACCESS ATTACK

CROSS-REFERENCES TO RELATED APPLICATIONS

This application claims priority of Chinese Patent Application No. 201410465196.1, filed on Sep. 12, 2014, the entire contents of which are incorporated by reference herein.

FIELD OF THE INVENTION

The present invention generally relates to the field of communication technology and, more particularly, to a method and system for detecting unauthorized access attack on computer systems and networks.

BACKGROUND

Unauthorized access vulnerability is a logical flaw. It is also a common security vulnerability of web applications. Similar to access control, sensitive information are generally involved. When the unauthorized access vulnerability is exploited, the damage is relatively large. In general, an unauthorized access attack has several different appearances, such as missed operation, added operation, disordered operation sequence, etc.

Missed operation is to execute a next step operation directly, such as bypassing an authorization operation. For example, during a multi-step process, a shopping operation is executed directly, bypassing a payment operation. In such process, the access to a webpage depends on an authorization result from another webpage. Due to implementation errors, mutual dependent relationships are incorrectly implemented, as long as an attacker learns about the next-step or next-stage webpage which should be accessed in the next step or stage, the attacker may be able to access the webpage directly, leading to unauthorized access vulnerability.

Added operation is to execute operations not under one's authority. For example, when this vulnerability is exploited, an attacker, after logging on a private account, may view other people's orders by modifying the order numbers and other parameters, etc.

Disordered operation sequence is to execute operations not in accordance with a predefined operation sequence to avoid the risk of program verification.

Because the unauthorized access is a normal website access operation, and security gateways often cannot distinguish between a normal application and an abnormal application. Therefore, unlike other cyber attacks, which can be detected through an automated detecting environment, the unauthorized access vulnerability is very difficult to be discovered.

It should be noted that the above information is only used to assist in understanding the technical aspects of the present invention, and it does not represent that such information is prior art. The disclosed methods and systems are directed to solve one or more problems set forth above and other problems in the art.

BRIEF SUMMARY OF THE DISCLOSURE

One aspect of the present invention discloses a method for detecting unauthorized access attack. The detecting method includes obtaining at least one HTTP request and at least one URL address of the HTTP request by parsing the HTTP request; determining whether there exist one or more protection rules corresponding to the URL address; and, when it is determined that the protection rules corresponding to the URL address exit, obtaining access data of the HTTP request. The detecting method also includes determining whether the access data satisfies the protection rules; and, when it is determined that the access data does not satisfy the protection rules, determining the corresponding HTTP request of the URL address to be an unauthorized access attack.

Another aspect of the present invention discloses an unauthorized access attack detecting system. The detecting system includes an analyzing module, a first determining module, an obtaining module, and a second determining module. The analyzing module is configured to obtain at least one HTTP request and at least one URL address of the HTTP request by parsing the HTTP request. The first determining module is configured to determine whether there exist one or more protection rules corresponding to the URL address. The obtaining module is configured to, when the first determines that the protection rules corresponding to the URL address exit, obtain access data of the HTTP request. Further, the second determining module is configured to determine whether the access data satisfies the protection rules and, when the second determining module determines that does not satisfy the protection rules, determine the corresponding HTTP request of the URL address to be an unauthorized access attack.

Other aspects of the present disclosure can be understood by those skilled in the art in light of the description, the claims, and the drawings of the present disclosure.

The implementations, features and advantages of the present invention will be further described with embodiments and accompanying drawings.

DETAILED DESCRIPTION

In order for those skilled in the art to better understand the technical solutions of the present invention, the followings describe in detail the present invention with specific embodiments together with accompanying drawings. It should be understood that the specific embodiments described herein are merely to illustrate the present invention and are not to limit the present invention.

Those skilled in the art should understand that the unauthorized access attack detecting method disclosed in the present invention may be implemented on a gateway device, such as a switch, a router, etc., or may also be implemented in any other device or apparatus for detecting of unauthorized access attack. For the convenience of description, the followings describe the embodiments of the unauthorized access attack detecting method implemented in a gateway device.

Figure 1:
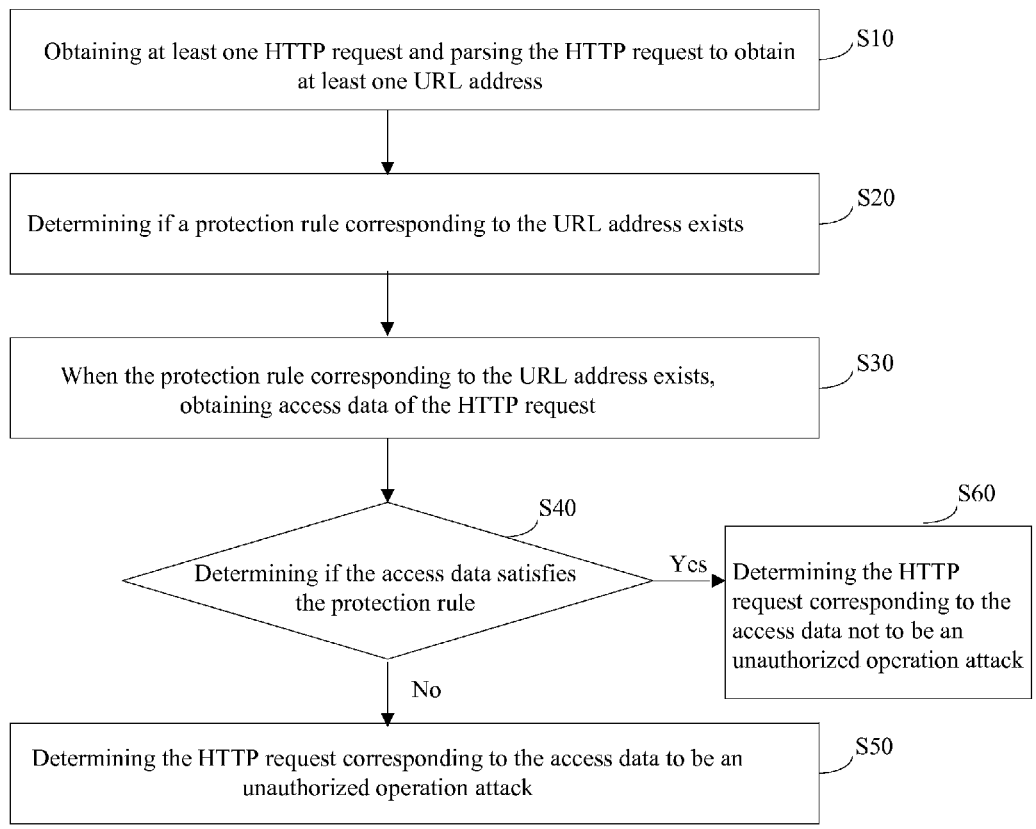
FIG. 1 illustrates a schematic flow chart of an exemplary unauthorized access attack detecting process consistent with the disclosed embodiments.

FIG. 1 illustrates a schematic flow chart of an exemplary unauthorized access attack detecting process consistent with the disclosed embodiments. As shown in FIG. 1, the detecting process may include the following steps.

Step S10, at the beginning of the process, at least one HTTP request is obtained and the HTTP request is parsed to obtain at least one URL address of the HTTP request. For example, a gateway device may use any appropriate pre-defined algorithm to parse the HTTP (HyperText Transfer Protocol) request to obtain the URL (Uniform Resource Locator) address.

In certain situations, a plurality of HTTP requests may be received and more than one URL addresses may be obtained.

Step S20, it is determined whether at least one protection rule corresponding to the URL address exists. The URL address may indicate a webpage to be accessed and, if the webpage needs to be protected, a protection rule may be set for protection against unauthorized access attack.

The protection rule may be pre-configured or pre-defined by a user. The protection rule may also be generated automatically through a self-learning process by the gateway device. For example, the protection rule may be any one of or any combinations of the following: an association relationship between the URL addresses of two or more HTTP requests, an access frequency range of the URL address of the HTTP request, an access duration range of the URL address of the HTTP request, and an access starting-time range of the URL address, etc.

The protection rule may also be configured or set according to the user's needs, and other protection rules may also be used.

Certain URL addresses may not be corresponding to any protection rule. These URL addresses may be unnecessary to be further detected. For example, for a shopping website, if a user does not log on, there will be no unauthorized access attack problem. Therefore, it is not necessary to detect these related HTTP requests.

Step S30, when the protection rule corresponding to the URL address exists, the access data of the HTTP request is obtained. For example, the access data may include at least one of following items: a source address, a URL address for access (an accessed URL address), an access starting time, a total number of accesses, an access duration, etc. The gateway device may obtain the access data by tracking and recording the HTTP request.

Step S40, after the access data is obtained, it is determined if the access data satisfies the protection rules.

Step S50, if it is determined that the access data does not satisfy the protection rules, the HTTP request corresponding to the access data is detected to be an unauthorized access attack.

Step S60, if it is determined that the access data does satisfy the protection rules, the HTTP request corresponding to the access data is detected not to be an unauthorized access attack.

The gateway device may compare the access data to the protection rules one-by-one to determine if the access data satisfies the protection rules. For example, when the protection rules include the association relationship among the URL addresses of two or more HTTP requests, the access frequency range of the URL address of the HTTP request, and the access duration range of the URL address of the HTTP request, the access data is analyzed against each of the protection rules one by one.

Specifically, the access data is analyzed to determine if the URL address of the HTTP request satisfies the association relationship among the URL addresses of two or more HTTP requests. The access data is then analyzed to determine if the access frequency of the URL address of the HTTP request is within the access frequency range of the URL address of the protection rule. Further, the access data is analyzed to determine if the access duration of the URL address of the HTTP request is within the access duration range of the URL address of the protection rule. When all the conditions are satisfied, the access data is determined to satisfy the protection rules.

According to the disclosed embodiments, by determining whether the access data satisfies the protection rules, the HTTP request may be detected automatically if the HTTP request is the unauthorized access attack, improving the detecting efficiency for the unauthorized access attack.

Figure 2:
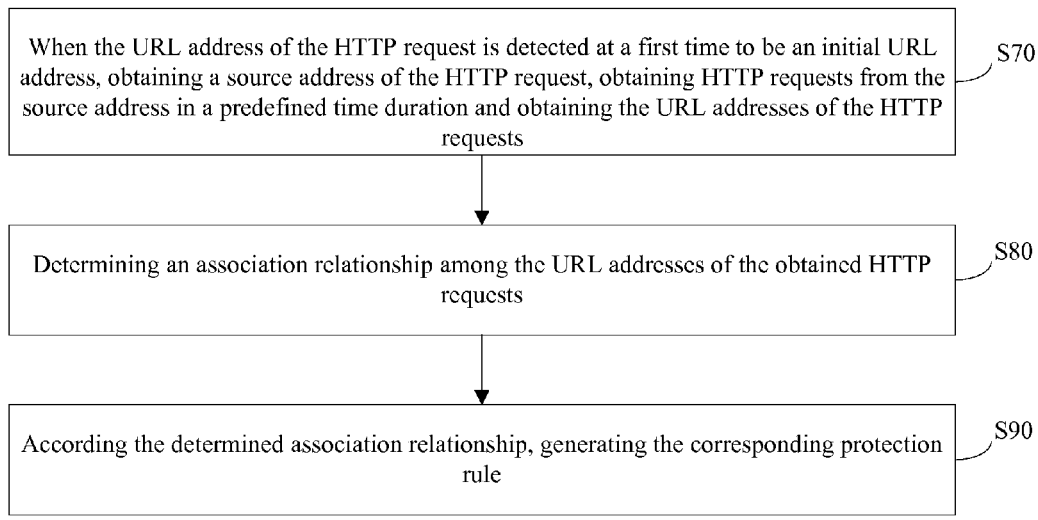
FIG. 2 illustrates a schematic flow chart of another exemplary unauthorized access attack detecting process consistent with the disclosed embodiments.

FIG. 2 illustrates a schematic flow chart of another exemplary method to detect unauthorized access attack according to the disclosed embodiments. As shown in FIG. 2, based on and further to those illustrated in FIG. 1, the unauthorized access detecting method may include the following steps before S10.

Step S70, when the URL address of the HTTP request is detected to be a pre-defined initial URL address at the first time, a source address of the HTTP request is obtained, one or more HTTP requests from the source address are obtained in a pre-defined duration, and the URL addresses of the HTTP requests are obtained.

The initial URL address may be configured or set in advance by a user according to the user's needs, and may also be set by the gateway device based on history data. The initial URL address is to mark a start point for the detection of unauthorized access attack. In other words, the detection of the unauthorized access attack starts when the HTTP request is detected to include the initial URL address. For example, for a shopping website or an online testing website, the URL address of a login page may be set as the initial URL address. Based on the initial URL address, the user may configure or set the start point for the unauthorized access attack detecting process. Thus, the disclosed unauthorized access attack detecting method meets different needs of individual users.

After the gateway device obtains the source address of the HTTP request, the gateway device obtains the HTTP requests from the source address in the pre-defined duration. The gateway device may use any appropriate method to obtain the source address of the HTTP request. The pre-defined duration may be set or configured in advance by the user or the gateway device. And the pre-defined duration is a time period for the gateway device to learn the protection rules. For example, the pre-defined duration may be 5 days, 10 days or any number of days. The specific time period for the pre-defined duration is not limited herein.

Any number of the source addresses may be obtained. That is, when multiple source addresses are detected that the URL addresses of the HTTP requests issued from those source addresses are the initial URL address, the HTTP requests issued from each source address are obtained respectively in the pre-defined duration.

Step S80, the association relationship among the URL addresses of the obtained HTTP requests is determined. The association relationship may include an access sequence of at least two URL addresses and the access frequency range of the URL addresses.

The gateway device may determine the access sequence of the URL addresses of the HTTP requests. Specifically, the access sequence of the URL addresses corresponding to the HTTP requests from each source address is obtained. If the URL addresses accessed by each source address include at least two URL addresses with the same visiting sequence, the access sequence of the two or more URL addresses is determined.

For example, for the online testing (or exam-taking) website, the URL address corresponding to a logon page must be accessed first before the URL address corresponding to a personal information page can be further accessed. Similar to the online testing website, for a shopping website, the URL address corresponding to a shopping cart page must be accessed first before the URL address corresponding to a payment page can be accessed, and finally the URL address corresponding to a transaction page can be accessed.

The gateway device may further determine the access frequency range of the URL address of the HTTP request. For example, the gateway device may determine the access frequency range of the URL addresses corresponding to the HTTP requests from each source address. The access starting-time of certain URL addresses accessed from each source address is also obtained. Counting from the starting time and within the pre-defined duration, a total number of accesses of a same URL address accessed from each source address is obtained to determine the access frequency of the URL address for each source address. Based on the access frequencies of the URL addresses of the HTTP requests from all the source addresses, the access frequency range of the URL addresses is obtained.

Step S90, according to the above determined association relationship, one or more corresponding protection rules are generated.

The gateway device may generate the corresponding protection rules based on the association relationship. Specifically, the protection rules use the association relationship as a measuring standard. When any URL address does not satisfy the association relationship, the corresponding HTTP request of the URL address is determined to be the unauthorized access attack.

According to the disclosed embodiment, the gateway device may automatically generate the protection rule through a self-learning process without manual configuration from technical staff, avoiding possible configuration errors caused by human error or incapable staff.

Figure 3:
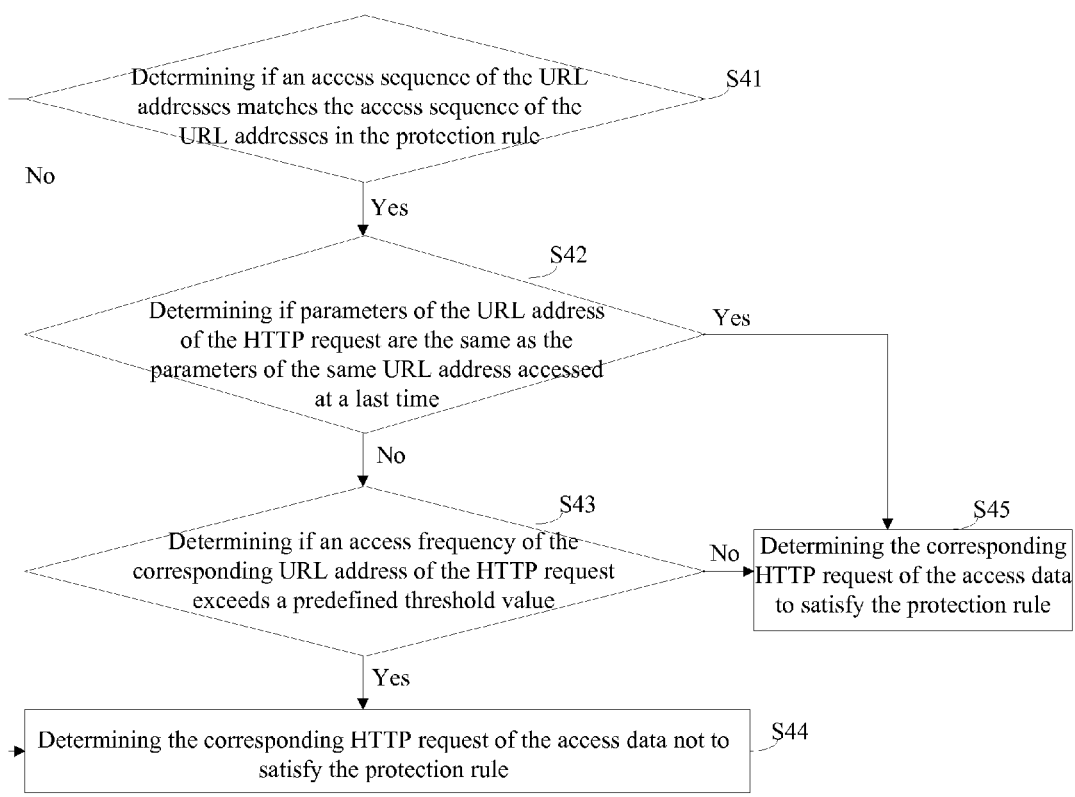
FIG. 3 illustrates a schematic flow chart of another exemplary unauthorized access attack detecting process consistent with the disclosed embodiments.

FIG. 3 illustrates a schematic flow chart of another exemplary the method to detect unauthorized access attack according to the disclosed embodiments. Based on and further to those illustrated in FIG. 2, the access data includes the source address, the access URL address, and the access frequency, etc., and step S40 further includes the following steps.

Step S41, based on the source addresses and the URL addresses of the HTTP requests, it is determine if the access sequence of the URL addresses matches the access sequence of the URL addresses in the protection rule. If the access sequence of the URL addresses matches the access sequence of the URL addresses in the protection rule, the HTTP request corresponding to the access data is determined to satisfy the protection rule; if the access sequence of the URL addresses does not match the access sequence of the URL addresses in the protection rule, the HTTP request corresponding to the access data is determined not to satisfy the protection rule.

The gateway device may use any appropriate algorithm to determine if the access sequence of the URL addresses matches the access sequence of the URL addresses in the protection rule. In an embodiment, the gateway device obtains all the URL addresses accessed from the source address. All the URL addresses are sorted in chronological order to obtain the access sequence of the URL addresses. The access sequence of the URL addresses is then compared with the access sequence of the corresponding URL addresses in the protection rule to determine if the access sequence of the URL addresses is the same as that in the protection rule.

If the access sequence is not the same as that in the protection rule, the access sequence of the URL addresses of the HTTP request is determined not to match the access sequence of the URL addresses in the protection rule. If the access sequence is the same as that in the protection rule, the access sequence of the URL addresses of the HTTP request is determined to match the access sequence of the URL addresses in the protection rule.

In another embodiment, the gateway device obtains the URL address accessed by the source address at the last time. The sequence of the URL address accessed at the last time and the URL address accessed at current time is compared with the access sequence in the protection rule to determine if the sequence is the same as the access sequence of the corresponding URL addresses in the protection rule. If the sequence is not the same as the access sequence in the protection rule, the access sequence of the URL address of the HTTP request is determined not to match the access sequence of the URL address in the protection rule. If the access sequence is the same as the access sequence in the protection rule, the access sequence of the URL address of the HTTP request is determined to match the access sequence of the URL address in the protection rule.

Step S42, if the access sequence of the URL addresses matches the access sequence of the URL addresses in the protection rule, it is determined if parameters of a URL address of the HTTP request are the same as the parameters of the URL address accessed at the last time by the same source address. If the parameters are the same, the corresponding HTTP request of the access data is determined to satisfy the protection rule.

Step S43, if the parameters are not the same, it is determined if the access frequency of the corresponding URL address of the source address exceeds a pre-defined threshold value.

Step S44, if it is determined that the access frequency exceeds the threshold value, the corresponding HTTP request of the access data is determined not to satisfy the protection rule.

Step S45, otherwise, if the access frequency is determined not to exceed the threshold value, the corresponding HTTP request of the access data is determined to satisfy the protection rule. The pre-defined threshold value may be set or configured in advance by the user or the gateway device.

Specifically, the access frequency may be obtained in many ways. In one embodiment, the gateway device may record a time interval between when the HTTP request is received from the source address at a first time to access the URL address and when the current HTTP request is received. Further, the total number of the HTTP requests from the source address to access the same URL address during the recorded time interval is also recorded. Thus, the access frequency of the URL address can be obtained by dividing the recorded total number of the HTTP requests by the recorded time interval.

In another embodiment, the gateway device may record a time interval between when the HTTP request is received from the source address at the last time to access the URL address and when the current HTTP request is received, and also record the total number of the HTTP requests from the source address to access the same URL address during the recorded time interval. The access frequency of the URL address can be obtained by dividing the total number of access by the recorded time interval.

Further, it may be first determined if the parameters of the URL address of the HTTP request are the same as the parameters of the URL address of the HTTP request from the same source address at the last time. Then, it may be determined if the access frequency of the URL address corresponding to the source address in the predefined time duration exceeds the predefined threshold value. Next, it may be determined if the access sequence of the URL address or addresses of the HTTP request or requests matches the access sequence of the URL addresses in the protection rule. Thus, missed operation and disordered operation sequence can be detected.

Alternatively, it may only need to determine if the parameters of the URL address of the HTTP request are the same as the parameters of the URL address of the HTTP request from the source address at the last time, and if the access frequency of the corresponding URL address of the source address in the predefined duration exceeds the predefined threshold value, without determining if the access sequence of the URL addresses of the HTTP requests matches the access sequence of the URL addresses in the protection rule.

Alternatively, it may only need to determine if the parameters of the URL address of the HTTP request are the same as the parameters of the URL address of the HTTP request from the source address at the last time, and if the access sequence of the URL addresses of the HTTP requests matches the access sequence of the URL addresses in the protection rule, without determining if the access frequency of the corresponding URL address of the source address in the predefined duration exceeds the predefined threshold value.

Thus, according to the disclosed embodiments, by determining if the access sequence of the URL addresses of the HTTP requests matches the access sequence of the URL addresses in the protection rule, the missed operations and disordered operation sequence may be detected. Further, by determining if the parameters of the URL address of the HTTP request are the same as the parameters of the URL address of the HTTP request issued at the last time by the source address, and if the parameters of the URL address of the HTTP request are the same as the parameters of the URL address of the HTTP request from the source address at the last time, added operations may be detected.

Further, in above unauthorized access attack detecting process, after step S40, the detecting process may further include: intercepting the HTTP request determined to be the unauthorized access attack. By automatically intercepting the HTTP request that is determined to be the unauthorized access attack, there may not need technical staffs to manually modify codes to defend the unauthorized access attack. Therefore, defense failure caused by human error or incapable coding skills can be avoid.

Figure 4:
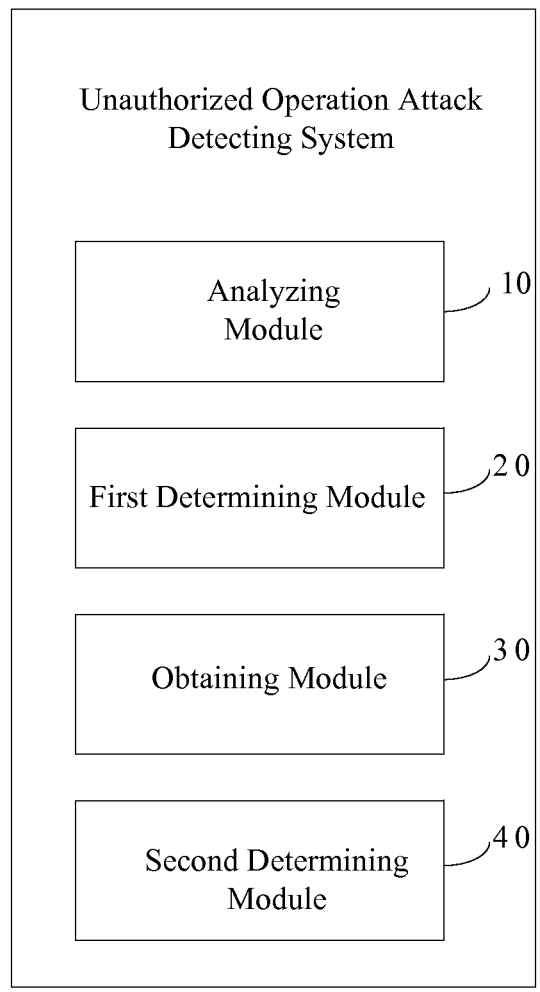
FIG. 4 illustrates a schematic functional block diagram of an exemplary unauthorized access attack detecting system consistent with the disclosed embodiments.

FIG. 4 illustrates a schematic functional block diagram of an exemplary unauthorized access attack detecting system according to the disclosed embodiments. As shown in FIG. 4, the unauthorized access attack detecting system may include an analyzing module 10, a first determining module 20, an obtaining module 30 and a second determining module 40.

The analyzing module 10 is configured to obtain at least one HTTP request and to parse the HTTP request to obtain at least one URL address of the HTTP request. The first determining module 20 is configured to determine if one or more protection rules corresponding to the URL address exist. The obtaining module 30 is configured to obtain access data of the HTTP request when any protection rule corresponding to the URL address exists. And the second determining module 40 is configured to determine if the access data satisfies the protection rule, and to determine that the corresponding HTTP request of the access data is an unauthorized access attack if the access data does not satisfy the protection rule.

The analyzing module 10 may use any appropriate predefined algorithm to parse the HTTP request to obtain the URL address of the HTTP request. The protection rule may be set or configured in advance by a user, may also be generated automatically by a gateway device through a self-learning process.

For example, a protection rule may be any one of or any combinations of two or more of the followings: an association relationship between the URL addresses of two or more HTTP requests, an access frequency range of the URL address of the HTTP request, an access duration range of the URL address of the HTTP request, and an access starting-time range of the URL address, etc. The protection rule may also be configured or set according to the user's needs, and other protection rules may also be used.

Certain URL addresses may not be corresponding to any protection rules. These URL addresses are not necessary to be further detected. For example, for a shopping website, if a user does not log on, there will be no unauthorized access attack problem. Therefore, it is not necessary to detect these related HTTP requests.

The access data includes at least one of: a source address, a URL address for access, an access starting time, a total number of accesses, an access duration, etc. The obtaining module 30 tracks and records the HTTP request to obtain the access data.

The second determining module 40 may compare the access data to the protection rules one-by-one to determine if the access data satisfies the protection rules. For example, when the protection rules include the association relationship among the URL addresses of two or more HTTP requests, the access frequency range of the URL address of the HTTP request, and the access duration range of the URL address of the HTTP request, the access data is analyzed against each of the protection rules one by one.

Specifically, the access data is analyzed to determine if the URL address of the HTTP request satisfies the association relationship among the URL addresses of two or more HTTP requests. The access data is then analyzed to determine if the access frequency of the URL address of the HTTP request is within the access frequency range of the URL address of the protection rule. Further, the access data is analyzed to determine if the access duration of the URL address of the HTTP request is within the access duration range of the URL address of the protection rule. When all the conditions are satisfied, the access data is determined to satisfy the protection rules.

According to the disclosed embodiments, by determining whether the access data satisfies the protection rules, the HTTP request may be detected automatically if the HTTP request is the unauthorized access attack, improving the detecting efficiency for the unauthorized access attack.

Figure 5:
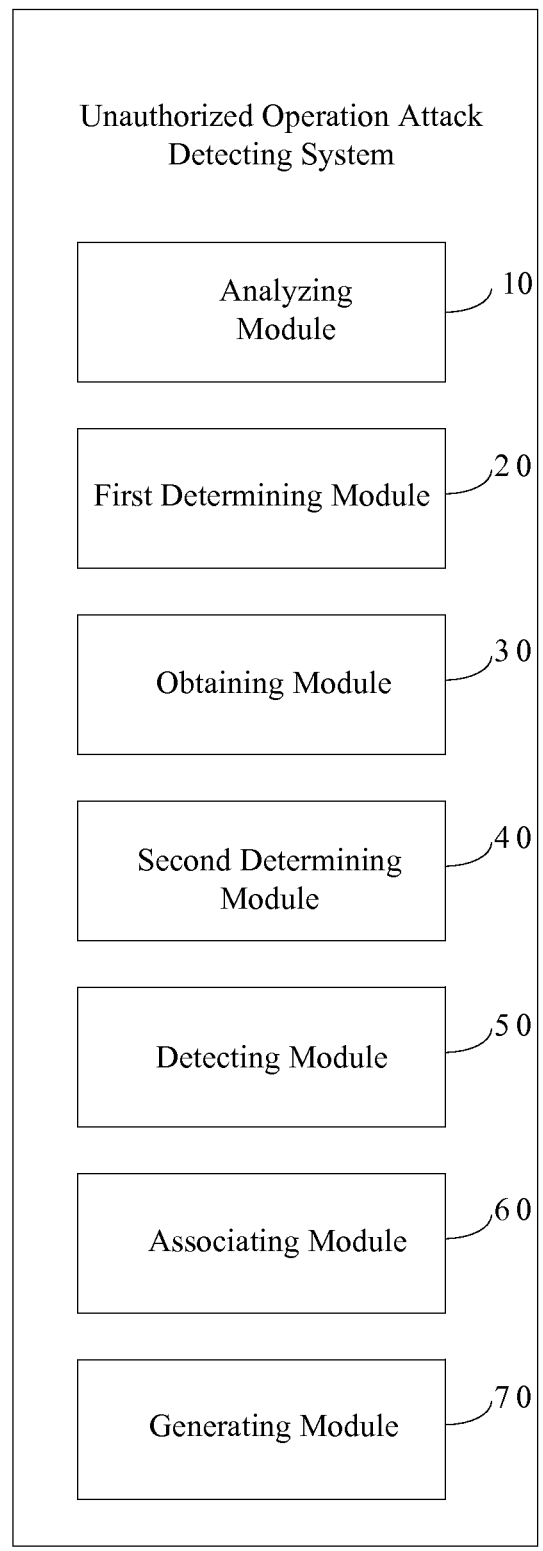
FIG. 5 illustrates a schematic functional block diagram of another exemplary unauthorized access attack detecting system consistent with the disclosed embodiments.

FIG. 5 illustrates a schematic functional block diagram of another exemplary unauthorized access attack detecting system according to the disclosed embodiments. As shown in FIG. 5, based on and further to those illustrated in FIG. 4, the detecting system may further include a detecting module 50, an associating module 60, and a generating module 70.

The detecting module 50 is configured to obtain a source address of the HTTP request, to obtain all the HTTP requests from the source address in a predefined time duration, and to obtain the URL addresses of the HTTP requests when URL address of the HTTP request is detected at a first time as an initial URL address. The associating module 60 is configured to determine the association relationship among the URL addresses of the obtained HTTP requests. And the generating module 70 is configured to generate the protection rules according to the determined association relationship.

The initial URL address may be configured or set in advance by a user according to the user's needs, and may also be set by the detecting module 50 based on history data. The initial URL address is to mark a start point for the detection of unauthorized access attack. In other words, the detection of the unauthorized access attack starts when the HTTP request is detected to include the initial URL address. For example, for a shopping website or an online testing website, the URL address of a login page may be set as the initial URL address. Based on the initial URL address, the user may configure or set the start point for the unauthorized access attack detecting process. Thus, the disclosed unauthorized access attack detecting method meets different needs of individual users.

Further, the detecting module 50 may use any appropriate method to obtain the source address of the HTTP request. The predefined time duration may be set or configured in advance by the user or the detecting module 50, and the predefined time duration is a time duration for the gateway device to learn the protection rules. The pre-defined duration may be set or configured in advance by the user or the gateway device. And the pre-defined duration is a time period for the gateway device to learn the protection rules. For example, the pre-defined duration may be 5 days, 10 days or any number of days. The specific time period for the pre-defined duration is not limited herein.

Any number of the source addresses may be obtained. That is, when multiple source addresses are detected that the URL addresses of the HTTP requests issued from those source addresses are the initial URL address, the HTTP requests issued from each source address are obtained respectively in the pre-defined duration.

Further, the association relationship may include an access sequence of at least two URL addresses and the access frequency range of the URL addresses.

The associating module 60 may determine the access sequence of the URL addresses of the HTTP requests. Specifically, the access sequence of the URL addresses corresponding to the HTTP requests from each source address is obtained. If the URL addresses accessed by each source address include at least two URL addresses with the same visiting sequence, the access sequence of the two or more URL addresses is determined.

For example, for the online testing (or exam-taking) website, the URL address corresponding to a logon page must be accessed first before the URL address corresponding to a personal information page can be further accessed. Similar to the online testing website, for a shopping website, the URL address corresponding to a shopping cart page must be accessed first before the URL address corresponding to a payment page can be accessed, and finally the URL address corresponding to a transaction page can be accessed.

The associating module 60 may determine the access frequency range of the URL address of the HTTP request in many ways. In one embodiment, the associating module 60 may determine the access frequency range of the URL addresses corresponding to the HTTP requests from each source address. The access starting-time of certain URL addresses accessed from each source address is also obtained. Counting from the starting time and within the pre-defined duration, a total number of accesses of a same URL address accessed from each source address is obtained to determine the access frequency of the URL address for each source address. Based on the access frequencies of the URL addresses of the HTTP requests from all the source addresses, the access frequency range of the URL addresses is obtained.

The generating module 70 generates the corresponding protection rules based on the association relationship. Specifically, the protection rules use the association relationship as a measuring standard. When any URL address does not satisfy the association relationship, the corresponding HTTP request of the URL address is determined to be the unauthorized access attack.

According to the disclosed embodiment, the unauthorized access attack detecting system may automatically generate the protection rules through the self-learning process without manual configuration from technical staff, avoiding possible configuration errors caused by human error or incapable staff.

In another embodiment, the access data further includes the source address, the access URL address, and the access frequency, and the second determining module 40 is further configured to, based on the source addresses and the URL addresses of the HTTP requests, determine if the access sequence of the URL addresses matches the access sequence of the URL addresses in the protection rule.

If the access sequence of the URL addresses does not match the access sequence of the URL addresses in the protection rule, the HTTP request corresponding to the access data is determined not to satisfy the protection rule. If the access sequence of the URL addresses matches the access sequence of the URL addresses in the protection rule, the second determining module 40 is further configured to determine if the parameters of the URL address of the HTTP request are the same as the parameters of the URL address accessed at the last time from the source address. If the parameters are the same, the corresponding HTTP request of the access data is determined to satisfy the protection rule.

If the parameters are not the same, the second determining module 40 is further configured to determine if the access frequency of the URL address accessed from the source address in the predefined duration exceeds a predefined threshold value. If the access frequency exceeds the threshold value, the corresponding HTTP request of the access data is determined not to satisfy the protection rule. And if the access frequency does not exceed the threshold value, the corresponding HTTP request of the access data is determined to satisfy the protection rule.

The second determining module 40 may determine if the access sequence of the URL addresses matches the access sequence of the URL addresses in the protection rule in many ways. In an embodiment, all the URL addresses accessed by the source address are obtained and sorted in chronological order to obtain the access sequence of the URL addresses. The access sequence of the URL addresses is then compared with the access sequence of the corresponding URL addresses in the protection rule to determine if the access sequence of the URL addresses is the same as that in the protection rule.

If the access sequence is not the same as that in the protection rule, the access sequence of the URL addresses of the HTTP request is determined not to match the access sequence of the URL addresses in the protection rule. If the access sequence is the same as that in the protection rule, the access sequence of the URL addresses of the HTTP request is determined to match the access sequence of the URL addresses in the protection rule.

In another embodiment, the URL address accessed at the last time by the source address is obtained. The sequence of the URL address accessed at the last time and the URL address accessed at current time is compared with the access sequence in the protection rule to determine if the sequence is the same as the access sequence of the corresponding URL addresses in the protection rule. If the sequence is not the same as the access sequence in the protection rule, the access sequence of the URL address of the HTTP request is determined not to match the access sequence of the URL address in the protection rule. If the access sequence is the same as the access sequence in the protection rule, the access sequence of the URL address of the HTTP request is determined to match the access sequence of the URL address in the protection rule. Further, the predefined threshold value may be set or configured by the user or the gateway device.

Further, the access frequency may be obtained in many ways. In an embodiment, a time interval may be recorded as the time duration between when the HTTP request is received from the source address at a first time to access the URL address and when the current HTTP request is received. Further, the total number of the HTTP requests from the source address to access the same URL address during the recorded time interval is also recorded. Thus, the access frequency of the URL address can be obtained by dividing the recorded total number of the HTTP requests by the recorded time interval.

In another embodiment, the time interval may be recorded as the time duration between when the HTTP request is received from the source address at the last time to access the URL address and when the current HTTP request is received, and also record the total number of the HTTP requests from the source address to access the same URL address during the recorded time interval. The access frequency of the URL address can be obtained by dividing the total number of access by the recorded time interval.

According to the disclosed embodiment, the parameters of the URL address of the HTTP request may be first determined if the parameters are the same as the parameters of the URL address of the HTTP request issued by the source address at the last time. Next, the access frequency of the URL address corresponding to the source address in the predefined duration is determined if the access frequency exceeds the predefined threshold value. Then, the access sequence of the URL addresses of the HTTP requests is determined if the access sequence matches the access sequence of the URL addresses in the protection rule. Thus, the disclosed embodiment may detect missed operations and disorder operation sequences.

Further, it may be first determined if the parameters of the URL address of the HTTP request are the same as the parameters of the URL address of the HTTP request from the same source address at the last time. Then, it may be determined if the access frequency of the URL address corresponding to the source address in the predefined time duration exceeds the predefined threshold value. Next, it may be determined if the access sequence of the URL address or addresses of the HTTP request or requests matches the access sequence of the URL addresses in the protection rule. Thus, missed operation and disordered operation sequence can be detected.

Alternatively, it may only need to determine if the parameters of the URL address of the HTTP request are the same as the parameters of the URL address of the HTTP request from the source address at the last time, and if the access frequency of the corresponding URL address of the source address in the predefined duration exceeds the predefined threshold value, without determining if the access sequence of the URL addresses of the HTTP requests matches the access sequence of the URL addresses in the protection rule.

Alternatively, it may only need to determine if the parameters of the URL address of the HTTP request are the same as the parameters of the URL address of the HTTP request from the source address at the last time, and if the access sequence of the URL addresses of the HTTP requests matches the access sequence of the URL addresses in the protection rule, without determining if the access frequency of the corresponding URL address of the source address in the predefined duration exceeds the predefined threshold value.

In another embodiment, the unauthorized access attack detecting system may further include an intercepting module (not shown in the drawings) to intercept the HTTP requests determined as the unauthorized access attacks.

According to the disclosed embodiment, the HTTP requests, which are determined to be the unauthorized access attacks, are intercepted proactively. Therefore, manual code modifications by the technical staffs are not required to defend the unauthorized access attacks, avoiding failed defense caused by human error or incapable technical staffs.

Figure 6:
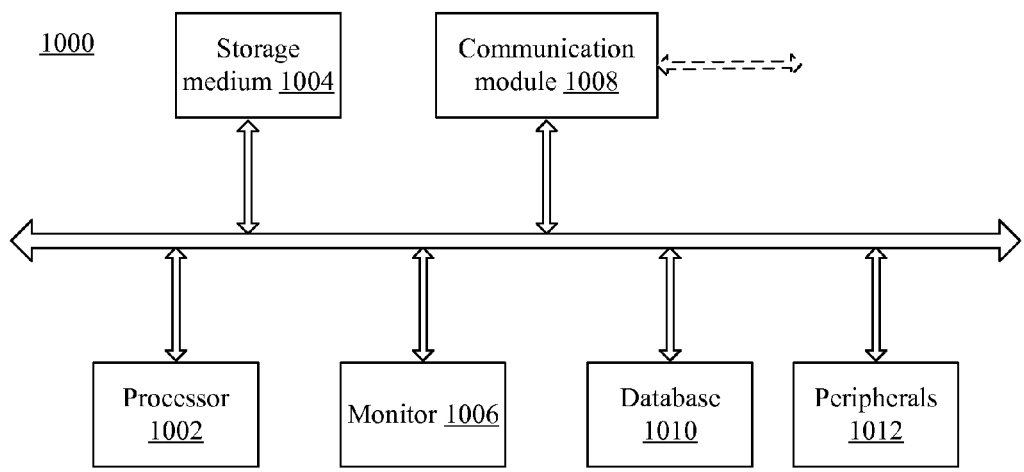
FIG. 6 illustrates a schematic block diagram of an exemplary unauthorized access attack detecting system according to disclosed embodiments of the present invention.

FIG. 6 illustrates an unauthorized access attack detecting system. As shown in FIG. 6, the unauthorized access attack detecting system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network. Database 1010 may include one or more databases for storing certain data and for performing certain operations on the stored data, such as database searching.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A method for detecting unauthorized access attack, comprising:

obtaining at least one HTTP request and at least one URL address of the at least one HTTP request by parsing the at least one HTTP request;

determining whether there exists one or more protection rules corresponding to the at least one URL address;

in response to determining that the one or more protection rules corresponding to the at least one URL address exist, obtaining access data of one of the at least one HTTP request having a protection rule, and stopping detection of access data of one of the at least one HTTP request without a protection rule;

determining whether obtained access data satisfies the one or more protection rules; and when it is determined that the obtained access data does not satisfy the one or more protection rules, determining the one of the at least one HTTP request corresponding to the obtained access data to be an unauthorized access attack.

2. The unauthorized access attack detecting method according to claim 1, wherein one of the one or more protection rule includes at least a combination of two or more of an association relationship between URL addresses of two or more HTTP requests, an access frequency range of a URL address of an HTTP request, an access duration range of a URL address of an HTTP request, and an access starting-time range of a URL address.

3. The unauthorized access attack detecting method according to claim 1, before obtaining at least one HTTP request and the at least one URL address of the at least one HTTP request, further comprising: generating the one or more protection rules by a self-learning process.

4. The unauthorized access attack detecting method according to claim 3, wherein generating the one or more protection rules by a self-learning process further includes:

detecting a URL address of an HTTP request at a first time as being a predefined initial URL address, the initial URL address being defined before detecting the URL address and is used as a starting point for detection of unauthorized attacks;

obtaining a source address of detected HTTP request;

receiving HTTP requests from obtained source address and obtaining URL addresses of received HTTP requests, the HTTP requests being sent from the source address within a predefined time duration;

determining an association relationship among obtained URL addresses of the received HTTP requests; and generating the one or more protection rules based on determined association relationship.

5. The unauthorized access attack detecting method according to claim 4, wherein the association relationship includes at least an access sequence of at least two of the obtained URL addresses and an access frequency range of each of the obtained URL addresses.

6. The unauthorized access attack detecting method according to claim 5, wherein the obtained access data includes the source address, the obtained URL addresses, and an access frequency of one of the obtained URL addresses.

7. The unauthorized access attack detecting method according to claim 6, wherein determining whether the obtained access data satisfies the one or more protection rules further includes:

according to the source address and the obtained URL addresses of the HTTP requests, determining whether the access sequence of the obtained URL addresses matches an access sequence of the obtained URL addresses in the one or more protection rules;

in response to determining that the access sequence of the obtained URL addresses does not match the access sequence of the obtained URL addresses in the one or more protection rules, determining that an HTTP request corresponding to the obtained access data does not satisfy the one or more protection rules; and in response to determining that the access sequence of the obtained URL addresses matches the access sequence of the obtained URL addresses in the one or more protection rule, determining whether parameters of the obtained URL address of the HTTP request are same as parameters of the obtained URL address accessed by the source address at a last time.

8. The unauthorized access attack detecting method according to claim 7, further including:

in response to determining that the parameters of the obtained URL addresses of the HTTP request are the same as the parameters of the obtained URL addresses accessed by the source address at the last time, determining that the HTTP request of the obtained access data satisfies the one or more protection rules; and in response to determining that the parameters of the obtained URL addresses of the HTTP request are not the same as the parameters of the obtained URL addresses accessed by the source address at the last time, determining whether the access frequency of one of the obtained URL addresses corresponding to the source address exceeds a predefined threshold value.

9. The unauthorized access attack detecting method according to claim 8, further including:

in response to determining that the access frequency of one of the obtained URL addresses corresponding to the source address exceeds the predefined threshold value, determining that the HTTP request of the obtained access data does not satisfy the one or more protection rules; and in response to determining that the access frequency of one of the obtained URL addresses corresponding to the source address does not exceed the predefined threshold value, determining that the HTTP request of the obtained access data satisfies the one or more protection rules.

10. The unauthorized access attack detecting method according to claim 1, further including:

intercepting the one of the at least one HTTP request determined as the unauthorized access attack.

11. A related unauthorized access attack detecting system, comprising:

an analyzing module configured to obtain at least one HTTP request and at least one URL address of the at least one HTTP request by parsing the at least one HTTP request;

a first determining module configured to determine whether there exists one or more protection rules corresponding to the at least one URL address;

an obtaining module configured to, in response to firstly determining that the one or more protection rules corresponding to the at least one URL address exist, obtain access data of one of the at least one HTTP request having a protection rule, and stop detection of access data of one of the at least one HTTP request without a protection rule;

a second determining module configured to determine whether obtained access data satisfies the one or more protection rules and, in response to secondly determining that the obtained access data does not satisfy the one or more protection rules, determine the one of the at least one HTTP request corresponding to the obtained access data to be an unauthorized access attack.

12. The unauthorized access attack detecting system according to claim 11, further including:
a detecting module configured to detect a URL address of an HTTP request at a first time as being a predefined initial URL address, to obtain a source address of detected HTTP request, and to receive HTTP requests from obtained source address within a predefined time duration and obtain URL addresses of received HTTP requests, the initial URL address being defined before detecting the URL address and is used as a starting point for detection of unauthorized attack;
an associating module configured to determine an association relationship among obtained URL addresses of the received HTTP requests; and
a generating module configured to generate the one or more protection rules based on determined association relationship.

13. The unauthorized access attack detecting system according to claim 12, wherein the obtained access data includes the source address, the obtained URL addresses and an access frequency of one of the obtained URL addresses.

14. The unauthorized access attack detecting system according to claim 13, wherein the second determining module is further configured to:
according to the source address and the obtained URL addresses of the HTTP requests, determine whether an access sequence of the obtained URL addresses matches an access sequence of the obtained URL addresses in the one or more protection rules;
in response to determining that the access sequence of the obtained URL addresses does not match the access sequence of the obtained URL addresses in the one or more protection rules, determine that an HTTP request corresponding to the obtained access data does not satisfy the one or more protection rules; and
in response to determining that the access sequence of the obtained URL addresses matches the access sequence of the obtained URL addresses in the one or more protection rules, determine whether parameters of the obtained URL addresses of the HTTP requests are same as parameters of the obtained URL addresses accessed by the source address at a last time.

15. The unauthorized access attack detecting system according to claim 14, wherein the second determining module is further configured to:
in response to determining that the parameters of the obtained URL addresses of the HTTP requests are the same as the parameters of the obtained URL addresses accessed by the source address at the last time, determine that an HTTP request corresponding to the obtained access data satisfies the one or more protection rules; and
in response in determining that the parameters of the obtained URL addresses of the HTTP requests are not same as the parameters of the obtained URL addresses accessed by the source address at the last time, determine whether an access frequency of the obtained URL addresses corresponding to the source address exceeds a predefined threshold value.

16. The unauthorized access attack detecting system according to claim 15, wherein the second determining module is further configured to:
in response in determining that the access frequency of the obtained URL addresses corresponding to the source address exceeds the predefined threshold value, determine that the HTTP request corresponding to the access data does not satisfy the one or more protection rules; and
in response in determining that the access frequency of the obtained URL addresses corresponding to the source address does not exceed the predefined threshold value, determine that the HTTP request corresponding to the access data satisfies the one or more protection rules.

17. The unauthorized access attack detecting system according to claim 11, further including:
an intercepting module configured to intercept the one of the at least one HTTP request determined as the unauthorized access attack.

* * * * *